United States Patent [19]

Howard

[11] E Patent Number: Re. 32,835

[45] Reissued Date of Patent: Jan. 17, 1989

[54] POLARIZED SIGNAL RECEIVER SYSTEM

[75] Inventor: H. Taylor Howard, San Andreas, Calif.

[73] Assignee: Chaparral Communications, Inc., San Jose, Calif.

[21] Appl. No.: 795,426

[22] Filed: Nov. 6, 1985

Related U.S. Patent Documents

Reissue of:

[64] Patent No.: 4,414,516
Issued: Nov. 8, 1983
Appl. No.: 322,446
Filed: Nov. 18, 1981

[51] Int. Cl.[4] ..... H01P 1/165

[52] U.S. Cl. ..... 333/21 A; 333/254; 343/786

[58] Field of Search ..... 333/21 R, 21 A, 249, 333/254; 343/756, 786, 731, 741, 764, 842

[56] References Cited

U.S. PATENT DOCUMENTS

| | | | |
|---|---|---|---|
| 2,483,217 | 9/1949 | Martin | 343/790 |
| 2,548,821 | 4/1951 | Riblet et al. | 343/786 |
| 2,680,810 | 6/1954 | Korman | 343/756 |
| 2,742,612 | 4/1956 | Cohn | 333/21 R |
| 2,878,471 | 3/1959 | Butler | 343/756 |
| 2,880,399 | 3/1959 | Murphy | 333/21 R X |
| 3,109,144 | 10/1963 | Heninger et al. . | |
| 3,681,714 | 8/1972 | Terakawa | 333/254 |
| 3,732,508 | 5/1973 | Ito et al. . | |
| 4,071,833 | 1/1978 | Gould . | |
| 4,168,504 | 9/1979 | Davis | 343/786 |
| 4,375,052 | 2/1983 | Anderson | 333/21 A |

OTHER PUBLICATIONS

The IRE Transactions on Antennas and Propagation, Loop Antenna Measurements, Phyllis A. Kennedy, Oct. 1956, pp. 610–618.

The Bell System Technical Journal Publication, The Spacecraft Antennas, J. T. Bangert, R. S. Engelbrecht, E. T. Harkless, R. V. Sperry and E. J. Walsh, Jul. 1963, pp. 869–897.

The IEEE Transactions on Antennas and Propagation, Nov. 1970, pp. 804–807.

The IEEE Transactions on Microwave Theory and Techniques Publication, vol. MTT-26, No. 8, Aug. 1978, pp. 550–556.

"Coops" Satellite Digest pp. T9–T10, Sep. 1981.

*Primary Examiner*—Paul Gensler
*Attorney, Agent, or Firm*—Lewis H. Eslinger

[57] ABSTRACT

A rotatable polarized signal receiver in a system for receiving linearly polarized electromagnetic signals includes a signal conductor having a receiver probe portion, oriented in a circular waveguide parallel to the polarization of the incident signal, and signal launch probe portion extending into the rectangular waveguide orthogonal to the direction of signal transmission therein, mounted concentrically in an insulator rod through perpendicular coupling of the circular and rectangular waveguides.

23 Claims, 2 Drawing Sheets

POLARIZED SIGNAL RECEIVER SYSTEM

Matter enclosed in heavy brackets [ ] appears in the original patent but forms no part of this reissue specification; matter printed in italics indicates the additions made by reissue.

BACKGROUND AND SUMMARY OF THE INVENTION

In satellite retransmission of communication signals, two linearly polarized signals, rotated 90 degrees from each other, are used. In less expensive installations for receiving such signals, the feed horn for the receiving system is installed with the orientation parallel to the desired signal polarization. The other polarization is not detected and is simply reflected back out of the feed horn. For more expensive installations, the entire feed horn and low noise amplifier system is mounted on a rotator similar to the type used on home television antennas to select the desired signal polarization.

While the above-mentioned system are cost effective, they are mechanically cumbersome and limit system performance. Other prior art signal polarization rotators electrically rotate the signal field in a ferrite media. While such rotators eliminate the mechanical clumsiness of the above-described rotators, they are expensive and introduce additional signal losses (approximate 0.2 DB) into the receiving system. See, for example, such an electronic antennae rotator marketed under the trade name "Luly Polarizer" by Robert A. Luly Associates, P.O. Box 2311, San Bernardino, CA.

The present invention eliminates the mechanical disadvantages of several prior art rotators and eliminates signals losses associated with other prior art rotators. A signal detector constructed according to the principles of the present invention comprises a transmission line having a signal receiver probe portion ("RP portion") and a signal launch probe portion ("LP portion") mounted in dielectric rod at the one end of a circular waveguide and a rectangular waveguide perpendicularly coupled to the circular waveguide. The RB portion of the transmission line detects polarized incoming signals in the circular waveguide and the LP portion launches the detected signal into the rectangular waveguide for transmission to a low noise amplifier ("LNA").

In the preferred embodiment, the transmission line, by its coupling to the insulator rod, may be rotated continuously and selectively by a servo motor mounted on the waveguide assembly. As the RP portion rotates to receive the desired signal, the LP portion also rotates. However, the launched signal or the signal received at the LNA is unaffected because rotation of the LP portion is about its axis of symmetry in the rectangular waveguide. The RP portion in the circular waveguide rotates between the two orthogonally polarized signals impinging on the feed horn. By rotation to the desired polarization, that signal is received and the other reflected. The selected signal is then conducted along the transmission line to the rear wall of the circular waveguide portion of the feed horn and is launched into the rectangular waveguide by the LP portion.

DESCRIPTION OF THE PREFERRED EMBODIMENT

Figure 1:
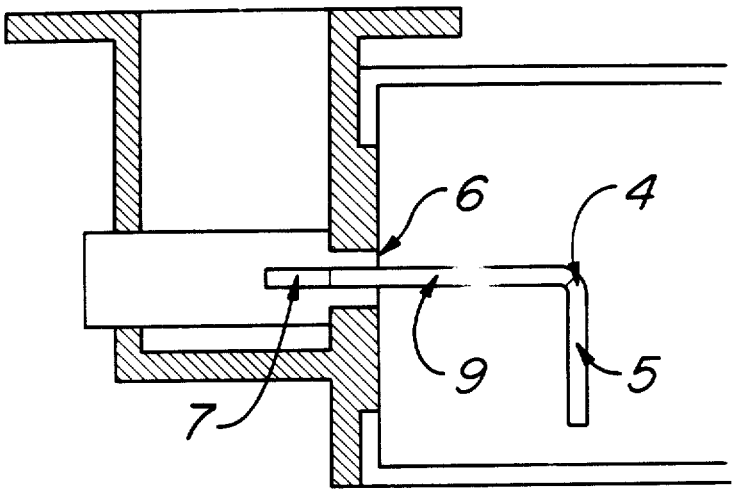
Prior Art Fig. 1
FIG. 1 is a cross-sectional view of a prior art waveguide assembly with an internal rotating signal detector.

Referring first to FIG. 1, prior art mechanical internal rotating signal receivers provided low impedances coaxial transmission line through the back of the circular waveguide at 6 to LP portion 7. However, RP portion 5 of transmission line 9 presents an incorrect impedance to the incident signal, because the energy is coupled from the high impedance end of RP portion 5 at 4 by transmission line portion 9 and the low impedance end of RP portion 5 is open circuited. Thus, the transmission line and RP portion impedance present in this configuration are reversed for effective detection of an incident wave.

Figure 2:
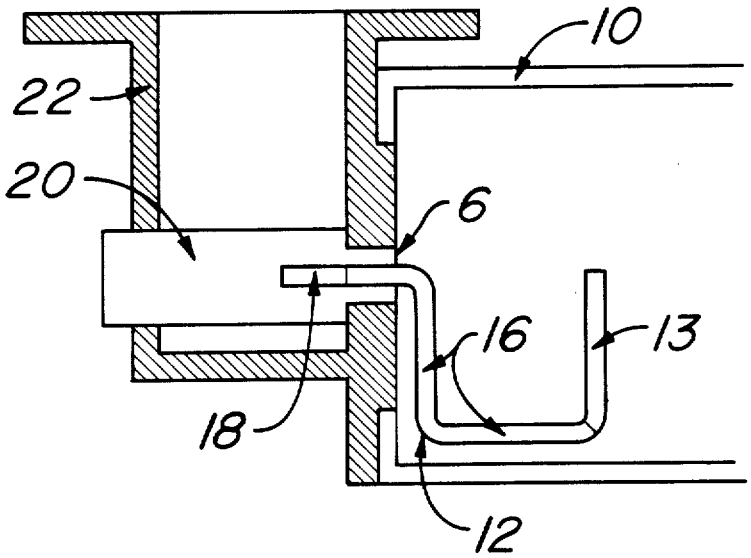
FIG. 2 is a cross-sectional view of a waveguide assembly with internal rotating signal detector constructed according to the principles of the present invention.

Referring now to FIG. 2, one embodiment of the present invention comprises circular waveguide 10 perpendicularly coupled to rectangular waveguide 22 and including signal conductor 12 fixedly mounted in insulator 20. Signal conductor 12 includes RP portion 13 oriented orthogonal to the axis of symmetry of circular waveguide 10, portion 18 extending into, and orthogonal to the axis of, waveguide 22, and coupled to RP portion 13 by conductor portions 16. Signal conductor 12 is typically constructed of a single, continuous homogeneous electrical conductor wherein RP portion 13 is approximately one-quarter wavelength long and transmission line portions 16 form a transmission line in the same manner that any single wire above a ground plane becomes a transmission line. The portion of signal conductor 12, extending through the rear wall of round waveguide 10 at 6, forms a low impedance coaxial transmission line. LP portion 18 launches the detected signal into rectangular waveguide 22.

Insulator 20, constructed of polystyrene or other suitable dielectric rod, provides mounting for signal conductor 12, electrical insulation of the line from the walls of waveguides 10 and 22, and for selective rotation of signal conductor 12 about its axis of symmetry. Since signal conductor 12 is concentric with axis of rotation of insulator 20, rotation of insulator 20 about its axis rotates LP portion 18, which correspondingly rotates RP portion 13 orthogonally about the axis of symmetry of waveguide 10. RP portion 13 is thereby oriented to the polarity of the desired incident signal for detection.

Figure 3:
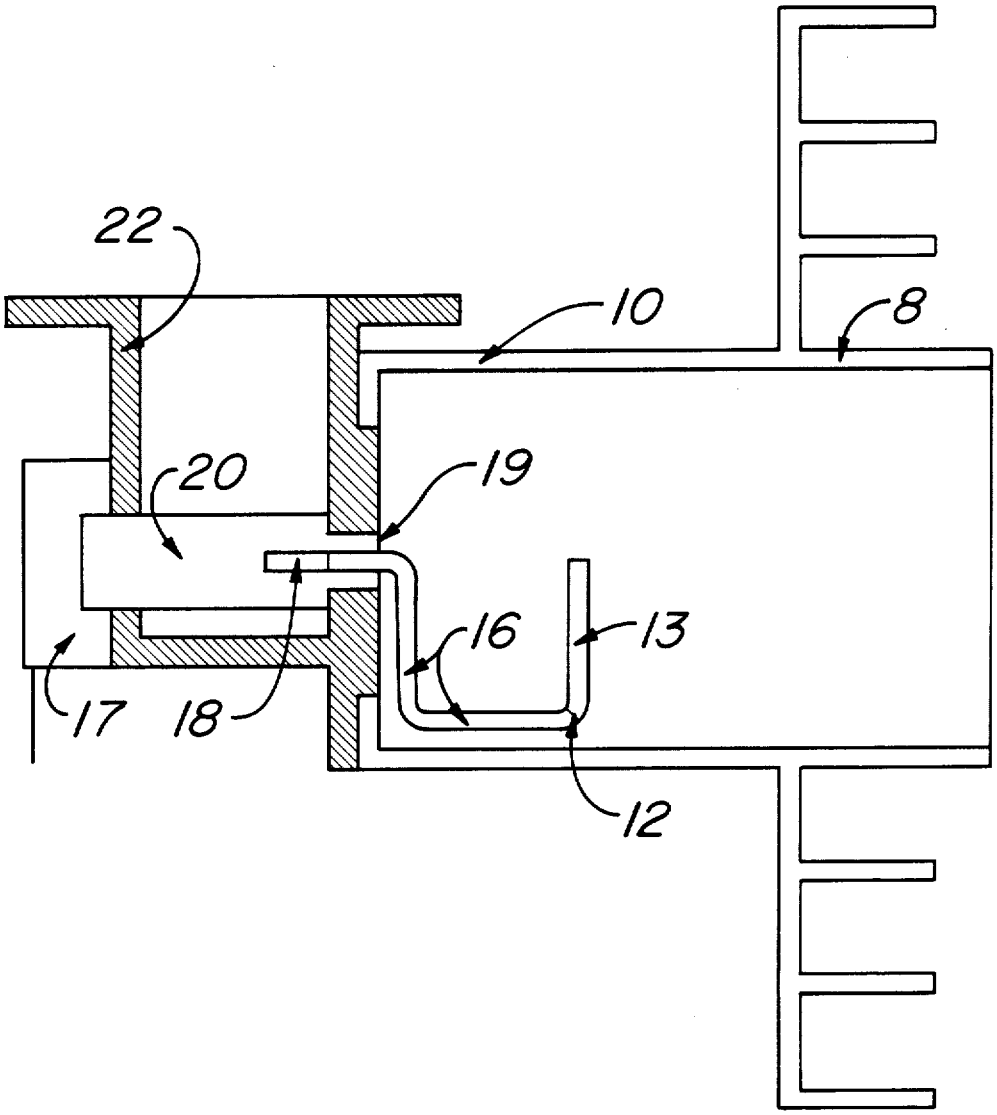
FIG. 3 is a cross-sectional view of a waveguide assembly and internal rotating signal detector of FIG. 2 further including a feed horn.

The preferred embodiment of the present invention is shown in FIG. 3. In this configuration, circular waveguide 10 is coaxially coupled to feed horn 8 at one end and perpendicularly coupled to rectangular waveguide 22 at the other end. As in the configuration of FIG. 2, signal conductor 12 is coupled to insulator 20, which is coupled to servo motor 17 for positioning. Servo motor 17 is usually the same as or similar to servo motors used in remotely controlled model aircraft for control surface movement. Obviously, with the addition of servo motor 17, operation of the detector system may be remotely controlled from the operator's control panel. Feed horn 8 is of the type described in U.S. patent application Ser. No. 271,815, filed June 8, 1981. It could be also be of any other suitable type such as described in U.S. patent application Ser. No. 271,130, now abandoned or the U.S. patent application Ser. No. 292,509 entitled "Improved feed Horn for Reflector Antennae" filed Aug. 13, 1981, now U.S. Pat. No. 4,380,014.

The direction of signals transmitted in waveguide 22 is orthogonal to the direction of signals transmitted in waveguide 10. This configuration facilitates the simplicity of the present invention, since launching of signals into waveguide 22 is insensitive to rotation of LP portion 18, which rotation directly results from rotation of RP portion 13 necessary to select the desired signal.

LP portion 18 is capable of launching the detected signal into another waveguide of any shape or into coaxial cable transmission line. Thus, as the transmission line 12 rotates, RP portion 13 rotates orthogonally to, and LP portion 18 rotates concentrically with the axis of symmetry of the round waveguide. As the RP portion aligns with the desired linearly polarized signal present in the circular waveguide, the signal is detected and conducted along the transmission line to the LP portion, which launches the detected signal. As stated earlier in this specification, the launched signal or the signal received at the LNA (not shown) is unaffected by the orientation of RP portion 13 because LP portion 18 rotates about its axis of symmetry and such rotation retains the relative position of LP portion 18 with waveguide 22.

I claim:

1. A polarized signal receiver comprising:

a first waveguide for transmitting polarized signals;

a circular waveguide for receiving polarized signals at one end and coupled to the first waveguide at the other end, said other end having a rear wall;

an insulator rod, rotatably mounted through said other end of the circular waveguide; and signal conducting means, fixedly mounted in the insulator rod concentric with the axis of rotation thereof having a receiver probe portion oriented in the circular waveguide orthogonal to the axis of said circular waveguide for receiving one polarization of the incident signal, a launch probe portion concentric with the insulator rod and extending into the first waveguide for launching said signal therein, and a transmission line portion, having a first section contoured to the inside surface of the circular wall, and substantially parallel to the axis, of the circular waveguide, and having a second section contoured to the inside surface, and substantially parallel to the plane, of the rear wall of the circular waveguide, for connecting the receiver probe portion to the launch probe portion.

2. A polarized signal receiver as in claim 1 further including a feed horn for receiving incident polarized signals, coaxially coupled to said one end of the circular waveguide.

3. A polarized signal receiver as in claim 1 further including remotely controllable motor means coupled to the insulator rod for selectively rotating the signal conducting means mounted therein.

4. A polarized signal receiver as in claim 1 or 2 wherein the inside surfaces of the rear and circular walls of the circular waveguide form waveguide walls and the ground plane element of the transmission line portion.

5. A polarized signal receiver as in claim 1 or 2 wherein the launch probe is orthogonal to the direction of signal transmission in the first waveguide.

6. A polarized signal receiver as in claim 1 or 2 wherein the first waveguide is a rectangular waveguide.

7. A polarized signal receiver as in claim 1 or 2 wherein the first waveguide is a circular waveguide.

8. A polarized signal receiver as in claim 1 or 2 wherein the first waveguide is a square waveguide.

9. A polarized signal receiver as in claim 1 or 2 wherein the first waveguide is an elliptical waveguide.

10. A polarized signal receiver as in claim 1 or 2 wherein the signal conducting means is a single continuous electrical conductor.

11. A polarized signal receiver as in claim 1 or 3 wherein the receiver probe portion is approximately one-quarter waveguide long.

12. A polarized signal receiver as in claim 1 or 3 wherein the signal conducting means is selectably rotatable to orient the receiver probe for receiving different polarizations of incident signal.

13. A polarized signal receiver as in claim 12 wherein the impedance of the launch probe and transmission line portions is substantially unaffected by the orientation of the receiver probe portion around the axis of the circular waveguide.

14. A polarized signal receiver as in claim 1 wherein the first and second sections of the transmission line portion and the launch probe portion all have substantially uniform impedance at the frequency of the signal received.

15. A polarized signal receiver as in claim 1 wherein said first section of the transmission line portion is generally parallel to the axis and near the surface of the circular wall of the circular waveguide and said second section of the transmission line portion is generally parallel to the plane, and near the surface, of the rear wall of the circular waveguide, said circular waveguide walls forming the ground plane of said transmission line portion.

*16. A polarized signal receiver comprising:*

*first and second waveguides adapted to enable propagation therein along their respective longitudinal axes of signals comprised of polarized electric fields within a predetermined range of frequencies;*

*a launch probe in said first waveguide and a receiver probe in said second waveguide, each said probe oriented substantially normal to the direction of propagation of the signal comprised of the electric field in the respective waveguide; and*

*a conductive element interconnecting said probes and entering said second waveguide in one direction through a point of entry surrounded by a first interior wall surface, said first interior wall surface facing in said one direction, said conductive element having a first portion displaced laterally from said point of entry to overlie said first interior wall surface and extending toward a second interior wall surface to a point closer to said second interior wall surface than to said point of entry, said conducting element having a second portion overlying said second interior wall surface, said second interior wall surface facing inwardly of said second waveguide in a direction different than said one direction, said conductive element cooperating with each of said interior wall surfaces as the ground plane therefor such that said conductive element and said interior wall surfaces constitute a single wire above a ground plane transmission line within said second waveguide for said predetermined range of frequencies.*

*17. The polarized signal receiver of claim 16 in which said second portion of said conductive element extends generally in the direction of the longitudinal axis of said second waveguide and conductively couples said first portion and said receiver probe.*

*18. The polarized signal receiver of claim 16 in which said first interior wall surface comprises an end wall of said second waveguide and said second interior wall surface comprises a sidewall of said second waveguide, said point of entry for said conductive element being substantially the center of said end wall.*

*19. The polarized signal receiver of claim 16 in which said conductive element and said probes are rotatable.*

*20. The polarized signal receiver of claim 16 in which said probes are arranged in a plane containing the longitudinal axis of said second waveguide.*

*21. The polarized signal receiver of claim 16 in which said receiver probe is open circuited and terminates in proximity to said longitudinal axis of said second waveguide.*

*22. The polarized signal receiver of claim 16 in which the length of said first portion of said conductive element is substantially equal to the length of said receiver probe.*

*23. A polarized signal receiver comprising:*

*first and second waveguides adapted to enable propagation therein along their respective longitudinal axes of signals comprised of polarized electric fields, said second waveguide having an end wall and a sidewall;*

*a launch probe in said first waveguide and a receiver probe in said second waveguide, each of said probes oriented substantially normal to the direction of propagation of the signal comprised of the polarized electric field in its corresponding waveguide; and*

*a conductive element passing through said end wall and interconnecting said probes, said element being displaced toward said sidewall and having a first section which overlies said end wall and a second section which is coupled to said first section at a point closer to said sidewall than to the longitudinal axis of said second waveguide, said second section extending over said sidewall generally in the direction of said longitudinal axis and conductively coupling said first section and said receiver probe so that said conductive element together with said end wall and sidewall acting as the ground plane for said conductive element constitute a single wire above a ground plane transmission line within said second waveguide.*

* * * * *